(12) United States Patent
Sorg

(10) Patent No.: US 8,853,874 B2
(45) Date of Patent: Oct. 7, 2014

(54) WIND POWER PLANT AND METHOD FOR CONTROLLING THE OPERATION OF A WIND POWER PLANT

(75) Inventor: Johannes Sorg, Ravensburg (DE)

(73) Assignee: ZF Friedrichschafen AG, Friedrichshafen (DE)

( * ) Notice: Subject to any disclaimer, the term of this patent is extended or adjusted under 35 U.S.C. 154(b) by 208 days.

(21) Appl. No.: 13/389,303

(22) PCT Filed: Jul. 14, 2010

(86) PCT No.: PCT/EP2010/060108
§ 371 (c)(1),
(2), (4) Date: Feb. 7, 2012

(87) PCT Pub. No.: WO2011/020653
PCT Pub. Date: Feb. 24, 2011

(65) Prior Publication Data
US 2012/0133155 A1  May 31, 2012

(30) Foreign Application Priority Data
Aug. 18, 2009  (DE) .......................... 10 2009 028 612

(51) Int. Cl.
| | |
|---|---|
| *F03D 9/00* | (2006.01) |
| *H02P 9/04* | (2006.01) |
| *F03D 11/00* | (2006.01) |
| *F03D 7/02* | (2006.01) |
| *F03D 11/02* | (2006.01) |

(52) U.S. Cl.
CPC  *F03D 7/02* (2013.01); *F03D 11/00* (2013.01); *Y02E 10/723* (2013.01); *F03D 7/0276* (2013.01); *F03D 7/0248* (2013.01); *F03D 11/02* (2013.01); *F05B 2260/40311* (2013.01); *Y02E 10/725* (2013.01); *F03D 9/002* (2013.01); *Y02E 10/722* (2013.01)

USPC .............................................. 290/44; 290/55

(58) Field of Classification Search
CPC ........... F03D 11/00; F03D 11/02; F03D 7/02; F03D 7/0248; F03D 7/0276; F03D 9/002
USPC ...................................................... 290/44, 55
See application file for complete search history.

(56) References Cited

U.S. PATENT DOCUMENTS 1,337,613 A * 4/1920 Moore .......................... 290/4 R
1,996,656 A * 4/1935 Saunders ........................ 322/30
(Continued)

FOREIGN PATENT DOCUMENTS

| AT | 507 392 A2 | 4/2010 |
|---|---|---|
| DE | 37 14 858 A1 | 11/1988 |

(Continued)

*Primary Examiner* — Tulsidas C Patel
*Assistant Examiner* — Thomas Quigley
(74) *Attorney, Agent, or Firm* — Davis & Bujold, PLLC; Michael J. Bujold

(57) ABSTRACT

A wind power turbine with a wind rotor which operates at variable speeds, a generator that can operate at a constant speed and an electric machine that can operate at a variable speeds, which are each in driving connection with one another by way of a superimposition transmission, such that as a power control device for regulating the speed of the generator, the electric machine is connected to a power grid and operates as a generator and motor. A controllable brake, for braking the generator, is arranged in the force flow between the transmission and the generator to extend the operating range of the wind power turbine down to lower wind speeds. When operating the turbine at low wind speeds, the brake is applied, the generator is deactivated, and electric current is produced by operating the electric machine as a generator, which is fed to the power grid.

17 Claims, 5 Drawing Sheets

(56) References Cited

U.S. PATENT DOCUMENTS

| | | | | |
|---|---|---|---|---|
| 2,698,576 | A | * | 1/1955 | Strub .................... 417/265 |
| 4,431,375 | A | * | 2/1984 | Carter et al. ............ 416/132 B |
| 4,443,155 | A | | 4/1984 | Smith |
| 4,522,561 | A | * | 6/1985 | Carter et al. ............ 416/11 |
| 4,522,564 | A | * | 6/1985 | Carter et al. ............ 416/140 |
| 4,871,923 | A | * | 10/1989 | Scholz et al. ............ 290/55 |
| 5,054,332 | A | * | 10/1991 | Terauchi et al. ......... 74/490.04 |
| 5,171,127 | A | * | 12/1992 | Feldman et al. ......... 416/119 |
| 5,183,386 | A | * | 2/1993 | Feldman et al. ......... 416/119 |
| 7,081,689 | B2 | | 7/2006 | Tilscher et al. |
| 7,494,193 | B2 | | 2/2009 | Wedekind |
| 7,560,824 | B2 | | 7/2009 | Hehenberger |
| 7,649,277 | B2 | | 1/2010 | Nitzpon et al. |
| 7,914,411 | B2 | | 3/2011 | Basteck |
| 2003/0064854 | A1 | * | 4/2003 | Kotani ................... 477/3 |
| 2004/0041409 | A1 | * | 3/2004 | Gabrys ................... 290/55 |
| 2004/0075279 | A1 | * | 4/2004 | Breth et al. ............. 290/55 |
| 2007/0108776 | A1 | * | 5/2007 | Siegfriedsen ............ 290/55 |
| 2008/0015081 | A1 | * | 1/2008 | Kamm et al. ........... 475/276 |
| 2010/0140952 | A1 | * | 6/2010 | Jansen ................... 290/55 |
| 2010/0276942 | A1 | * | 11/2010 | Hicks et al. ............. 290/1 C |

FOREIGN PATENT DOCUMENTS

| | | |
|---|---|---|
| DE | 202 12 459 U1 | 2/2004 |
| DE | 103 14 757 B2 | 11/2004 |
| DE | 103 61 443 A1 | 7/2005 |
| DE | 10 2007 019 665 A1 | 10/2008 |
| EP | 1 283 359 A1 | 2/2003 |
| EP | 1 895 157 A2 | 3/2008 |
| EP | 1 959 131 A2 | 8/2008 |
| WO | 2006/010190 A1 | 2/2006 |
| WO | 2009/016508 A2 | 2/2009 |
| WO | 2010/040167 A1 | 4/2010 |
| WO | 2010/135754 A2 | 12/2010 |

\* cited by examiner

WIND POWER PLANT AND METHOD FOR CONTROLLING THE OPERATION OF A WIND POWER PLANT

This application is a National Stage completion of PCT/EP2010/060108 filed Jul. 14, 2010, which claims priority from German patent application serial no. 10 2009 028 612.8 filed Aug. 18, 2009.

FIELD OF THE INVENTION

The invention concerns a wind power turbine, with a wind rotor that can be operated at variable speeds, a generator that can operate at constant speed and an electric machine that can be operated at variable speeds, which are in driving connection with one another by way of a superimposition transmission, and such that the electric machine, as a force regulation device for controlling the speed of the generator, can be operated both as a generator and as a motor and is connected to a power grid by way of a frequency invertor. The invention also concerns a method for controlling the operation of such a wind power turbine.

BACKGROUND OF THE INVENTION

As is known, the function of a wind power turbine is to convert the kinetic energy of wind into electrical energy. The electric current produced regeneratively in this way can be fed into a local or inter-regional power grid for the supply of electricity to consumers.

For the more powerful wind power turbines, a design has become established, in which a wind rotor, preferably comprising three rotor blades, is arranged on the windward side of an enclosure, to rotate about a horizontal rotational axis. The enclosure is mounted, by means of an azimuth bearing, to rotate about a vertical axis on a tower, which is fixed firmly in the ground by a foundation. The enclosure accommodates at least one step-up gearset and at least one generator for producing electrical energy. By virtue of the step-up gearset, whose input shaft is connected to the rotor hub of the wind rotor, the relatively low speed of the wind rotor is converted to a higher speed appropriate for the generator, with a corresponding change of the torque transmitted to the output shaft in direct or indirect driving connection with the rotor of the generator.

Older wind power turbines are often of fixed-speed design, i.e. in these wind power turbines, the speed of the wind rotor and hence also the rotor speed of the generator are kept constant by adjusting the angle of incidence of the rotor blades (pitch regulation) and/or by turning the rotor in its azimuth bearing away from or into the wind (stall regulation). In this way, with appropriate design of the transmission and the generator, the current produced by the generator, preferably designed as a synchronously running unit, can be fed into the power grid and this, it is true, without much power electronics cost and complexity, in particular without an expensive frequency inverter. However, the disadvantage of fixed-speed wind power units is the relatively small range of wind speeds in which they can operate effectively.

To expand the useful wind speed range and thereby increase the energy yield, wind power turbines have been developed in which both the wind rotor and the generator can operate at variable speeds. However, a variable-speed generator requires a frequency inverter by which the voltage, frequency and phase position of the electric current produced can be adapted so as to be compatible with the power grid conditions. Since all the electric current produced in the generator passes through the frequency inverter the latter has to be of correspondingly high-power design, but because of the increasing power of modern wind power plants this is associated with considerable costs and high breakdown potential.

Accordingly, to avoid these disadvantages wind power turbines have also been proposed, which comprise a wind rotor that can operate at variable speeds, a generator that operates at constant speed and a force regulation device, which are in driving connection with one another by way of a superimposition transmission. The superimposition transmission is preferably designed as a simple planetary transmission whose planetary carrier (web) is connected directly or via a step-up gearset to the hub of the wind rotor, whose sun gear is connected to the rotor of the generator or the force regulation device, and whose ring gear is connected to the force regulation device or the rotor of the generator. By fixing the ring gear or sun gear in forward rotation (same rotational direction as the wind rotor and generator rotor) or backward rotation (rotational direction opposite to that of the wind rotor and generator rotor) by means of the force regulation device, the gear ratio of the planetary transmission acting between the planetary carrier and the sun gear or ring gear can be regulated as a function of the variable speed of the wind rotor in such manner that the rotor speed of the generator is kept substantially constant. The rotor speed of the generator can additionally be influenced by pitch regulation and/or stall regulation.

In a drive-train that can be used in a wind power turbine according to DE 103 14 757 B3, the force regulation device is preferably designed as a hydrodynamic torque converter arranged coaxially over the output shaft that connects the sun gear of the superimposition transmission to the rotor of the generator. The pump impeller of the torque converter is connected in a rotationally fixed manner to the output shaft, whereas the turbine wheel of the torque converter is in driving connection with the ring gear of the superimposition transmission by way of a step-down gearset designed as a simple planetary transmission with a fixed planetary carrier (static transmission with rotation direction reversal), which is in driving connection with the ring gear of the superimposition transmission. To control the speed and torque absorbed by the pump impeller, the vanes of the torque converter can be adjusted.

As explained in more detail in the associated DE 103 61 443 B4, in such a drive-train, with an appropriate design of the superimposition transmission, the torque converter and the step-down gearset, and with an appropriate setting of the deflector vanes of the torque converter, passive—i.e. largely automatic—regulation can be achieved, by virtue of which, within a predetermined wind speed range, the wind rotor can be operated with variable speed at its optimum operating point in each case and at the same time the rotor speed of the generator can be kept constant. However, the disadvantage of this known wind power turbine is that despite the fact that the wind rotor operates at optimum efficiency, the overall efficiency is comparatively low because of the continual backflow of energy with poor efficiency through the torque converter.

In contrast, DE 37 14 858 A1 describes a transmission that can be used in a wind power turbine, in which the power control device is in the form of a second generator with lower power compared with the first generator (the main generator). In the embodiment variant shown in FIG. 3 of that document the rotor of the main generator is connected in a rotationally fixed manner to the ring gear of a superimposition transmission, whereas the rotor of the second generator is connected in a rotationally fixed manner by way of a driveshaft to the sun gear of the superimposition transmission. The second generator is positioned coaxially, axially behind the main generator as viewed from the wind rotor, so that the associated driveshaft runs centrally through the hollow rotor of the main generator. By appropriate regulation of the rotor speed and the torque absorbed by the second generator as a function of the rotor speed of the wind rotor, the rotor speed of the main rotor in high wind speeds can be kept constant. In this case the second generator produces electric current additionally to the main generator, although due to the variable-speed operation of that generator it has to be modulated by an associated frequency changer before being fed into a power grid.

From the description of a wind power turbine which is structurally slightly different but functionally identical in EP 1 283 359 A1, it is known that an electric machine provided as a power control device for keeping the generator's rotor speed constant can be operated both as a generator and as a motor. When the electric machine is operated as a generator, i.e. with the rotor of the electric machine and the sun gear of the superimposition transmission rotating in the same direction as the wind rotor and the rotor of the generator, the gear ratio acting between the wind rotor and the output shaft of the step-up gearset and the rotor of the generator becomes higher as the speed of the wind rotor increases compared with the condition when the sun gear is immobilized, which corresponds to operation of the wind power turbine at high wind speeds above the rated rotational speed of the wind rotor. During motor operation of the electric machine, i.e. when the rotor of the electric machine and the sun gear of the superimposition transmission are rotating in the opposite direction to the wind rotor and the rotor of the generator, the gear ratio acting between the wind rotor and the output shaft of the step-up gearset and the rotor of the generator becomes lower as the speed of the wind rotor decreases compared with the condition when the sun gear is immobilized, which corresponds to operation of the wind power turbine at average wind speeds below the rated speed of the wind rotor. During generator operation of the electric machine the additional electrical energy produced is fed into the power grid by way of an associated frequency inverter, whereas when the electric machine is operated as a motor the electrical energy needed for this is drawn from the power grid via the frequency inverter.

Generally, however, to further increase the energy yield of wind turbines it is desirable also to extend their operating range down to lower wind speeds.

SUMMARY OF THE INVENTION

Against this background the purpose of the present invention is to develop further a wind power turbine of the aforesaid type with a view to extending its operating range down to lower wind speeds. In addition, a method for controlling the operation of such a wind power turbine is indicated.

According to the invention, in terms of design the objective of extending the operating range of the wind power turbine is achieved, in that a controllable holding brake is arranged in the force flow between the superimposition transmission and the generator in order to arrest the generator when necessary.

The invention is thus based on a wind power turbine comprising a wind rotor that can be operated at variable speed, a generator that can operate at constant speed and an electric machine that can be operated at variable speed, which are in driving connection with one another by way of a superimposition transmission. The electric machine serves as a power control device for regulating the speed of the generator and, for that purpose, can be operated both as a generator and as a motor. To feed the electrical power produced during generator operation and to draw the electrical power required for motor operation, the electric machine is connected to a power grid by way of a frequency inverter. The operating range of a wind power turbine of such design is limited to high wind speeds above the rated speed of the wind rotor and average wind speeds below the rated speed of the wind rotor.

To extend the operating range of the wind power turbine to lower wind speeds, according to the invention a controllable holding brake, i.e. one that can be applied and released, is provided in the force flow between the superimposition transmission and the generator. At low wind speeds, at which although the wind rotor is still being driven the speed of the main generator can no longer be kept constant, this holding brake is applied. Consequently, the rotor of the main generator and the output element of the superimposition transmission connected thereto are immobilized relative to a housing component of the gondola. In this operating condition the main generator is inactive and the electric machine provided, as such, as a power control device is operated as a generator. During this the electric current produced by the electric machine is fed, via the associated frequency inverter, into the power grid. Thus, by virtue of the invention, which can be implemented relatively simply and inexpensively, it becomes possible with wind power turbines of the type concerned, which as such are designed for average and high wind speeds, to produce electrical energy at low wind speeds as well and therefore to increase their energy yield.

With a preferred design of the superimposition transmission as a simple planetary transmission, whose planetary carrier is in driving connection with the wind rotor, whose ring gear is connected by an associated driveshaft to the rotor of the generator and whose sun gear is connected to the rotor of the electric machine, the holding brake is arranged on the driveshaft.

In this context the holding brake can be in the form of a friction brake.

The friction brake is preferably designed as a disk brake with at least one brake disk arranged in a rotationally fixed manner on the driveshaft and at least one brake caliper fixed on the housing. Such brakes are sufficiently well known from automotive engineering and can, if needed, be adopted therefrom largely unchanged.

However, since the electric machine can also be used for synchronizing the rotational speeds, the holding brake can also be in the form of an interlocking brake, and is then characterized by wear-free operation and less maintenance effort.

The interlocking holding brake is preferably designed as a claw-type brake with a claw wheel arranged in a rotationally fixed manner on the driveshaft and a claw wheel mounted in a rotationally fixed manner relative to the housing, one of these claw wheels being able to be moved axially by means of an associated control device in the direction toward the other claw wheel. The claw teeth of the claw wheels can optionally be aligned axially or radially.

In terms of procedure the objective of controlling the operation of the wind power turbine is achieved according to the invention, in that at low wind speeds a controllable holding brake arranged in the force flow between the superimposition transmission and the generator is applied, the generator is deactivated and electric current is produced by operating the electric machine as a generator and is fed, via the frequency inverter, into the power grid.

As has already been explained, the method according to the invention starts from a wind power turbine that comprises a wind rotor which can be operated at variable speeds, a generator that can be operated at constant speed and an electric machine that can be operated at variable speeds, which are in driving connection with one another by way of a superimposition transmission. The electric machine is provided as a power control device for regulating the speed of the generator and for this purpose can be operated both as a generator and as a motor. For feeding in and drawing electrical energy, the electric machine is connected with a power grid via a frequency inverter.

By applying the holding brake the rotor of the generator and the output element of the superimposition transmission connected to it are immobilized relative to a housing component of the enclosure. Approximately simultaneously, the generator is deactivated and the electric machine is controlled to operate as a generator. Thus, with this wind power turbine even at low wind speeds electrical energy is produced, which would otherwise remain unused.

Temporarily, however, the prevailing wind speeds may be so low that although they are sufficient for driving the wind rotor and operating the electric machine as a generator in order to produce some little electric power, owing to a relatively high breakaway torque of the wind rotor attributable to high resistance torques in the bearings and gears of the transmission when changing from static friction to rolling and sliding friction, the low speeds are not sufficient to initiate the rotation of a static wind rotor.

According to a further development of the invention it is therefore proposed that in such a wind situation, i.e. when the wind speed is below a start-up value but above a minimum operating speed, the wind rotor is accelerated by operating the electric machine as a motor at least until the wind rotor has reached a minimum rotation speed, and the electric machine is then switched over to generator operation in order to produce electrical energy. In this way even extremely low wind speeds, at which wind turbines of the same size have until now been inactive, can be used to produce energy.

With an interlocking design of the holding brake, for example as a claw brake, before being applied the brake is expediently synchronized by operating the electric machine as a generator and/or as a motor.

During that process a tooth-on-tooth position at the holding brake is advantageously prevented in that if the wind rotor is rotating the holding brake is only synchronized until a specified minimum rotational speed difference has been reached, and if the wind rotor is static, when a minimum rotational speed difference has been produced at the holding brake.

BRIEF DESCRIPTION OF THE DRAWINGS

To clarity the invention the description is attached, of an example embodiment illustrated in the drawing which shows.

DETAILED DESCRIPTION OF THE PREFERRED EMBODIMENTS

Figure 1:
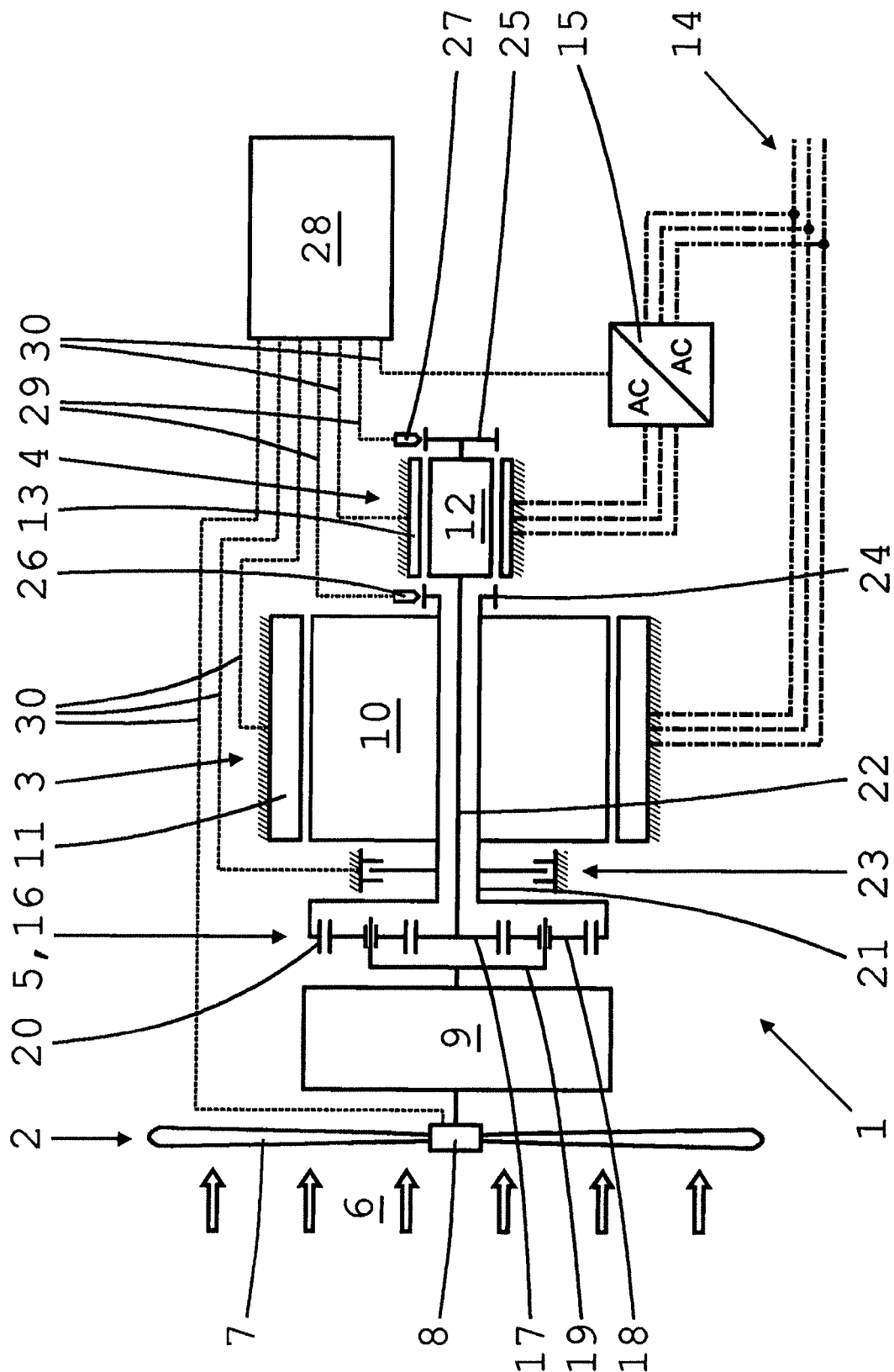
FIG. 1: A schematic representation of the structure of a preferred embodiment of the wind power turbine according to the invention.

A wind power turbine 1, as illustrated in FIG. 1, comprises a wind rotor 2 that can be operated at variable speeds, a generator 3 that can operate at constant speed and an electric machine 4 that can be operated at variable speeds, which are in driving connection with one another by way of a superimposition transmission 5 and are arranged coaxially in relation to a common geometric rotational axis in an enclosure (not shown in this case). The wind rotor 2, which can be powered by the wind 6, preferably has three aerodynamically shaped rotor blades 7 which are attached to a rotor hub 8, distributed uniformly circumferentially around the hub and able to undergo restricted rotation around their longitudinal axis. The rotor hub 8 is connected in a rotationally fixed manner to the input shaft of a main transmission 9 designed as a step-up transmission and formed, for example, as a simple spur gear stage or as a simple planetary transmission with its ring gear fixed to the housing.

The generator 3 that can be operated with a constant rotor speed is in the form of an internal-rotor unit with a radially inner rotor 10 having a central bore and a radially outer stator 11 fixed to the housing. The electric machine 4, which can be operated at variable rotor speeds, is also of internal-rotor design with a radially inner rotor 12 and a radially outer stator 13 fixed to the housing, and compared with the generator 3, is substantially less powerful. By virtue of its constant-speed operating mode the generator 3 is electro-technically directly connected to an electric power grid 14, while in contrast, owing to its variable-speed operating mode, the electric machine 4 is connected to the power grid 14 by way of a frequency inverter 15.

The superimposition transmission 5 is in the form of a simple planetary transmission 16 with a sun gear 17, a planetary carrier 19 carrying a plurality of planetary gears 18 and a ring gear 20. The planetary carrier 19 is connected in a rotationally fixed manner to the output shaft of the main transmission 9. The ring gear 20 is connected in a rotationally fixed manner to the rotor 10 of the generator 3 by way of a driveshaft 21 formed as a hollow shaft. The sun gear 17 is connected in a rotationally fixed manner to the rotor 12 of the electric machine 4 by way of a driveshaft 22 that passes through the hollow shaft 21 and the rotor 10 of the generator 3.

On the driveshaft 21 between the ring gear 20 of the superimposition transmission 5 and the rotor 10 of the generator 3 is arranged a controllable holding brake 23, i.e. one that can be applied and released, by means of which the rotor 10 of the generator 3 can if necessary be arrested relative to a component fixed on the housing. To determine the rotor speeds of the generator 3 and the electric machine 4, the rotors 10, 12 concerned comprise respective signal wheels 24, 25 with each of which a speed sensor 26, 27 is associated.

To control the wind power turbine 1 an electronic control unit 28 is provided, which is connected, via sensor leads 29, to the speed sensors 26, 27 and, via control leads 30, to the rotor hub 8 of the wind rotor 8, the holding brake 23, the energizing windings of the generator 3 and the electric machine 4, and to the frequency inverter 15. Below, the operation of the wind power turbine 1 will be explained in greater detail with reference to FIGS. 2 and 5, which are derived from FIG. 1.

Figure 2:
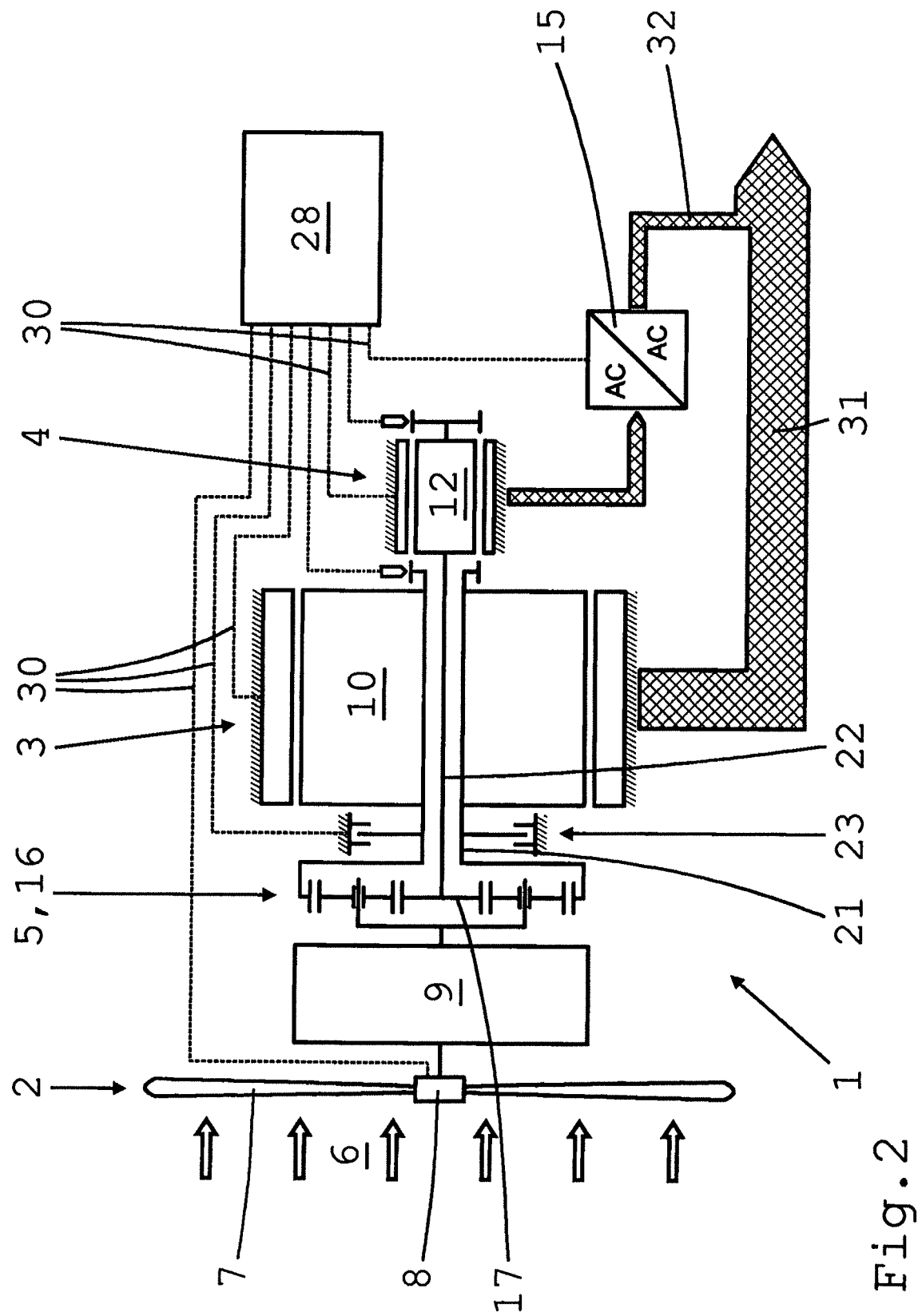
FIG. 2: The energy flow during a first mode of operating the wind power turbine of FIG. 1, FIG. 3: The energy flow during a second mode of operating the wind power turbine of FIG. 1, FIG. 4: The energy flow during a third mode of operating the wind power turbine of FIG. 1, and FIG. 5: The energy flow during a fourth mode of operating the wind power turbine of FIG. 1.

In a first operating mode of the wind power turbine 1 shown in FIG. 2, which is used at high wind speeds at which the wind rotor 2 is driven at a rotor speed above the rated speed, the electric machine 4 is switched to operate as a generator. During this the drag torque and the rotor speed of the electric machine 4, and along with them the gear ratio acting between the output shaft of the main transmission 9 and the driveshaft 21 of the generator 3, while the speed of the wind rotor 2 is variable, are regulated in such manner that the generator 3 is kept at its substantially constant, specified operating speed which, if it is designed as a synchronous machine with two pole pairs and a power grid frequency of 50 Hz, is about 1500 revolutions/min.

In this operating mode, which is known from DE 37 14 858 A1 and EP 1 283 359 A1, the rotor 12 of the electric machine 4 and the sun gear 17 of the superimposition transmission 5 rotate in the same direction as the wind rotor 2 and the rotor 10 of the generator 3. In this operating mode the holding brake 23 is open or released. In addition to the electrical energy 31 produced by the generator 3 and fed into the power grid 14, there is the energy 32 produced by the electric machine 4 which is adapted to the grid conditions by the frequency inverter 15 and which, in its order of magnitude, amounts to 5% to 20% of the energy 31 produced by the generator 3.

Figure 3:
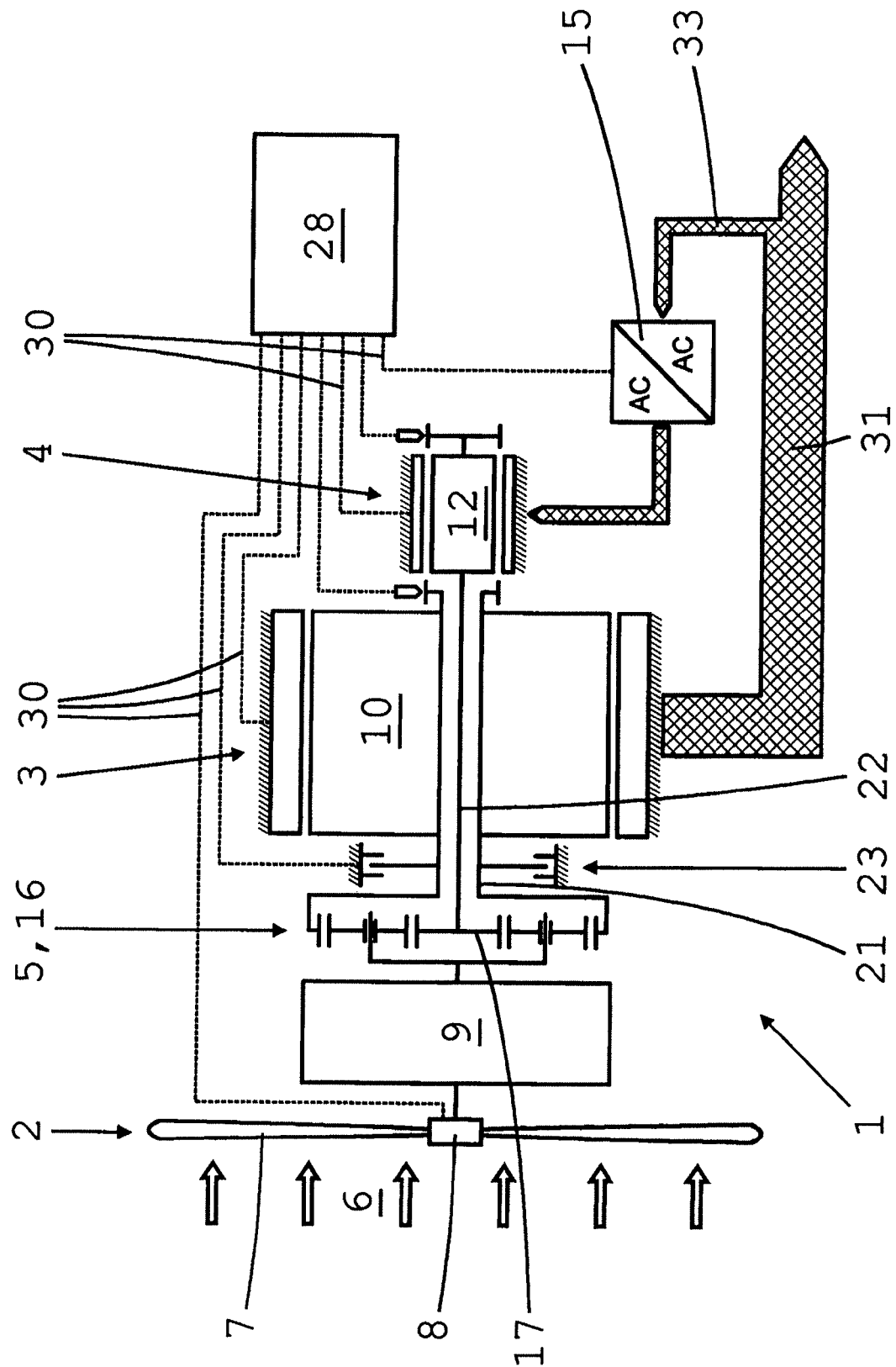

In a second operating mode of the wind power turbine 1 shown in FIG. 3, which is used at average wind speeds at which the wind rotor 2 is driven at a rotor speed lower than the rated speed, the electric machine 4 is switched to operate as a motor. During this the drive torque and rotor speed of the electric machine 4 and along with them the gear ratio acting between the output shaft of the main transmission 9 and the driveshaft 21 of the generator 3, at variable rotor speeds of the wind rotor 2, are regulated in such manner that the generator 3 is kept at its specified constant speed. In this operating mode, which is known at least from EP 1 283 359 A1, the rotor 12 of the electric machine 4 and the sun gear 17 of the superimposition transmission 5 rotate in the direction opposite to the wind rotor 2 and the rotor 10 of the generator 3. In this operating mode the holding brake 23 is again open or released. The energy 31 produced by the generator 3 is reduced by the energy 33, amounting to 5% to 20%, drawn by the electric machine 4 via the frequency inverter 15, so that in total a correspondingly reduced amount of energy is fed into the power grid 14. This drawn-off energy 33 is returned to the generator 3 by way of the electric machine 4, and therefore constitutes an energy flow that circulates within the wind power turbine.

Figure 4:
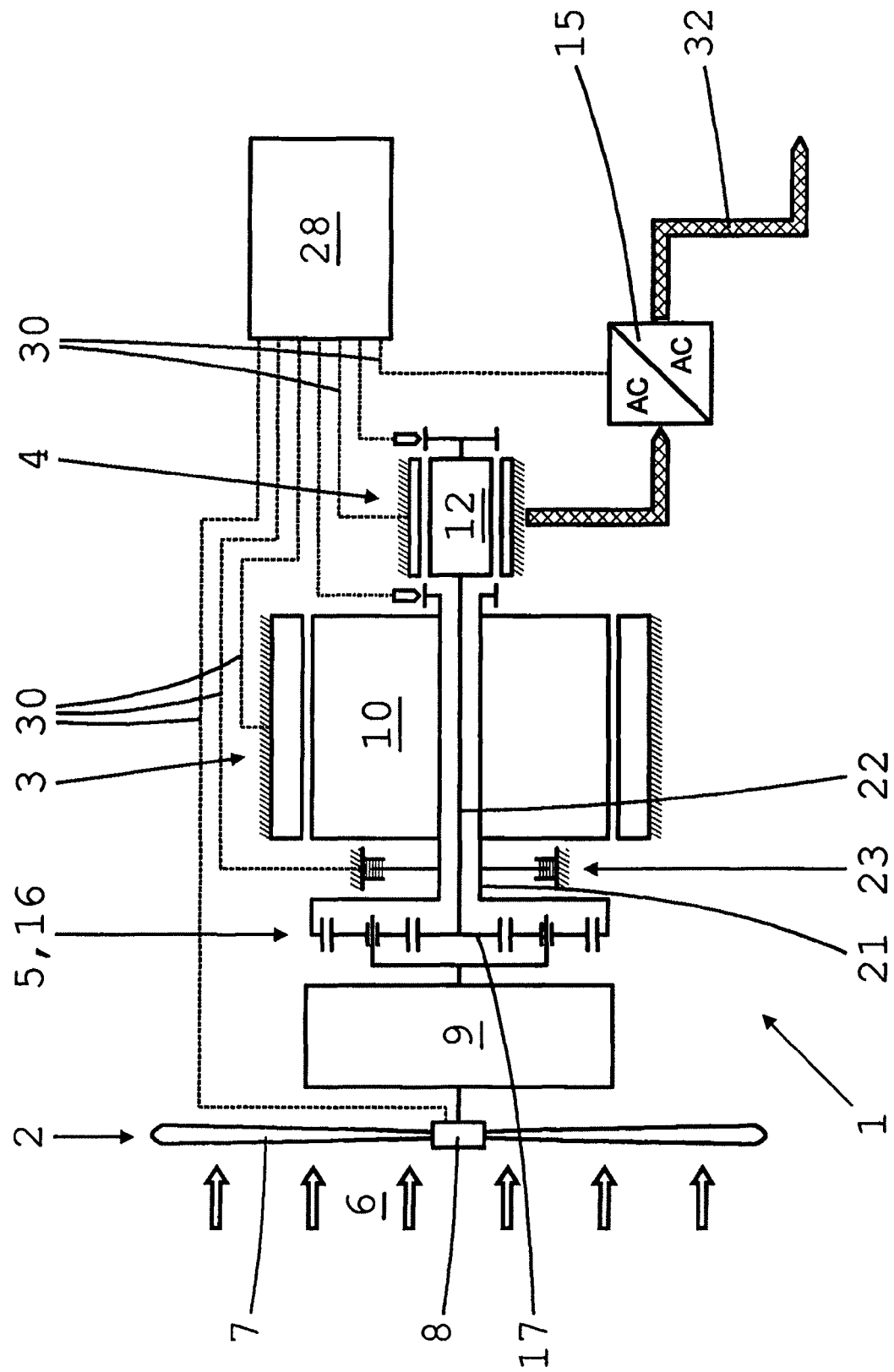

A third operating mode of the wind power turbine 1, shown in FIG. 4, is used with wind speeds at which the wind rotor 2 is driven at a rotor speed far lower than the rated speed but the rotor speed of the generator 3 can no longer be kept constant. In this operating mode the holding brake 23 is closed or applied, so the rotor 10 of the generator 3 and the ring gear 20 of the superimposition transmission 5 are arrested relative to a component of the enclosure fixed on the housing. The generator 3 is inactive and the superimposition transmission 5 acts as a static transmission with a gear ratio between 0.2 and 0.4. In this case the electric machine 4 is operated as a variable-speed generator and produces electrical energy 32, which is fed into the power grid 14 via the frequency inverter 15.

The holding brake 23 can be designed to act with interlock, for example as a claw brake, and in that case its application is expediently synchronized by operating the electric machine 4 as a generator and/or as a motor. With the third operating mode enabled by the holding brake 23, compared with known wind power turbines the operating range of the wind power turbine 1 according to the invention is extended down to lower wind speeds, whereby the energy yield of the wind power turbine can be increased considerably, especially in wind situations with longer weak-wind phases.

Figure 5:
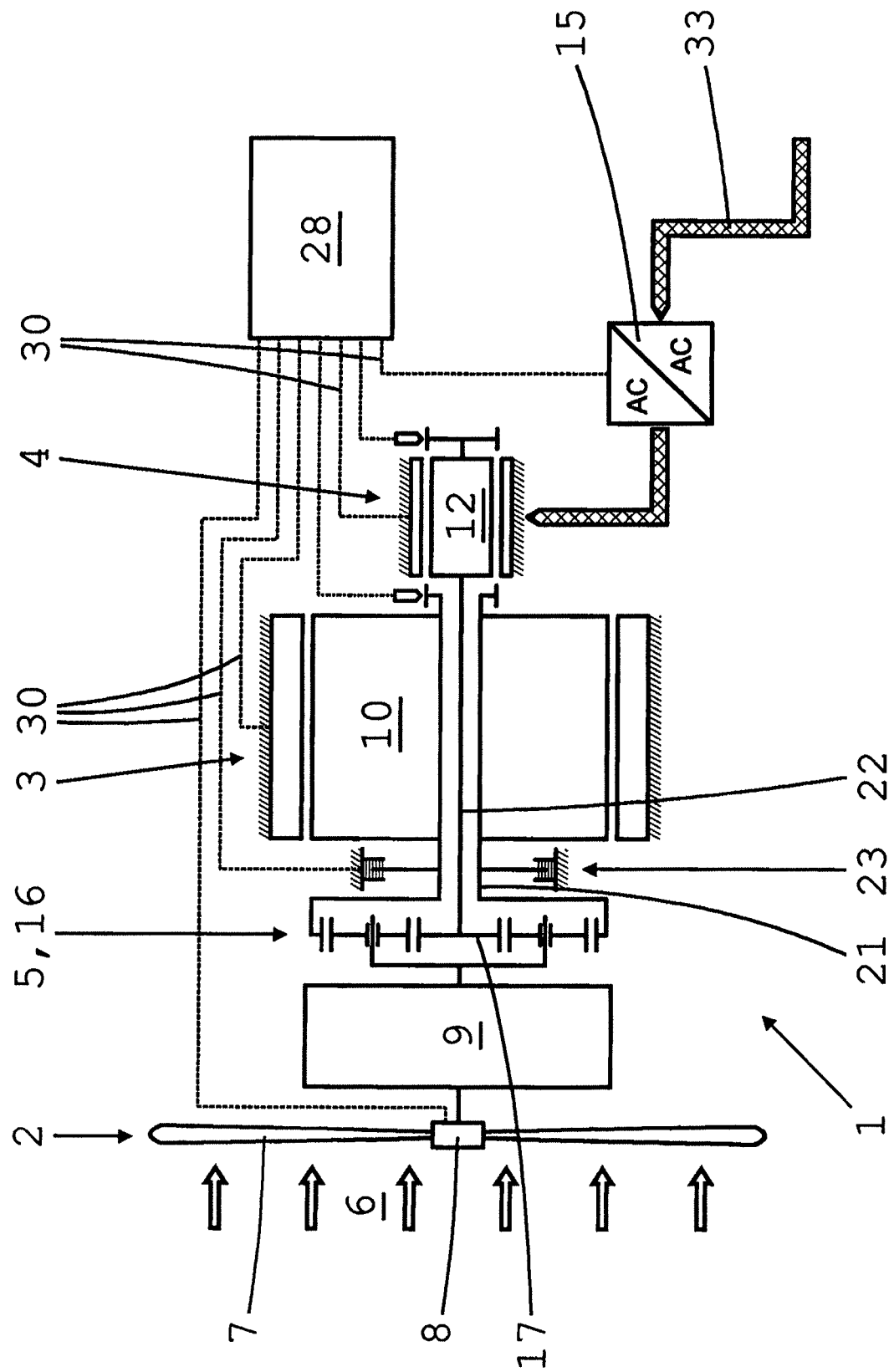

In a fourth operating mode of the wind power turbine 1, shown in FIG. 5, which is used with extremely low wind speeds which, although they are sufficient for keeping the wind rotor 2 moving and operating the electric machine 4 as a generator, are not sufficient for starting up the wind rotor 2 from rest, the holding brake 23 is closed or applied and the wind rotor 2 is accelerated by operating the electric machine 4 as a motor during this phase, at least until a rotational speed is reached at which it is ensured that the wind 6 can continue driving it. The electrical energy 33 required for this is drawn from the power grid 14 via the frequency inverter 15. Thereafter the electric machine 4 is again switched to generator operation and, in accordance with the third operating mode shown in FIG. 4, delivers electrical energy, which is fed into the power grid 14 via the frequency inverter 15. By starting up the rotation of the wind rotor 2 by means of the electric machine 4 and subsequently switching the electric machine 4 to generator operation, the operating range of the wind power turbine 1 according to the invention is extended to extremely low wind speeds.

The wind power turbine according to the invention can also be used for stabilizing the power grid, since it acts upon the power grid 14 as a so-termed phase shifter. For this, with the help of the control unit 28 the generator 3 is operated in such manner that it can draw reactive idle power from the power grid 14 and deliver that power into the power grid 14.

INDEXES

1 Wind power turbine
2 Wind rotor
3 Generator, main generator
4 Electric machine
5 Superimposition transmission
6 Wind
7 Rotor blade
8 Rotor hub
9 Main transmission, step-up transmission
10 Rotor of the generator
11 Stator of the generator
12 Rotor of the electric machine
13 Stator of the electric machine
14 Power grid
15 Frequency inverter
16 Planetary transmission
17 Sun gear
18 Planetary gear
19 Planetary carrier
20 Ring gear
21 Driveshaft, hollow shaft
22 Central driveshaft
23 Holding brake
24 Signal wheel of the generator
25 Signal wheel of the electric machine
26 Rotation speed sensor of the generator
27 Rotation speed sensor of the electric machine
28 Control unit
29 Sensor lead
30 Sensor lead
31 Energy fed in by the generator
32 Energy fed in by the electric machine
33 Energy drawn by the electric machine

The invention claimed is:

1. A wind power turbine with a wind rotor (2) that is operable at variable speeds,
   a generator (3) that has an input shaft and the generator (3) being operable at a constant speed, and
   an electric machine (4) that is operable at variable speeds,
   the generator and the electric machine are in driving connection with one another by way of a superimposition transmission (5) such that the electric machine (4) being operated as a power control device, either as a generator and as a motor, for regulating the speed of the generator (3), the electric machine (4) being connected to a power grid (14), via a frequency converter (15), for supplying the electric current to the power grid, via the frequency converter (15), when operating as a generator, and for receiving electric current from the power grid, via the frequency converter (15), when operating as a motor, a controllable holding brake (23) being arranged, in a power flow, between the superimposition transmission (5) and the generator (3), and the holding brake being actuatable, at low wind speed, to directly couple the driveshaft of the generator to a housing for braking and deactivating the generator (3) and preventing rotation of the generator (3), so that all electric current flowing to and from the power grid only flows through the frequency inverter (15) and the electric machine (4), and the holding brake (23) being of an interlocking design.

2. The wind power turbine according to claim 1, wherein the holding brake (23) is a claw brake with a claw wheel arranged in a rotationally fixed manner on the driveshaft (21) of the generator, and a claw wheel mounted in a rotationally fixed manner on the housing, and one of the claw wheels is displacable, by an associated control device, toward the other claw wheel.

3. The wind power turbine according to claim 1, wherein the wind rotor (2) is connected to a main transmission (9) which is connected to the superimposition transmission (5).

4. The wind power turbine according to claim 1, wherein the superimposition transmission (5) comprises a sun gear (17), a planetary carrier (19) and a ring gear (20), the planetary carrier (19) is connected to the main transmission (9), the sun gear (17) is connected to a rotor (12) of the electric machine (4) and the ring gear (20) is continuously connected to the brake (23) and a rotor (10) of the generator (3).

5. The wind power turbine according to claim 1, wherein the brake (23), the generator (3) and the wind rotor (2) each communicate with a control unit (28) which engages the brake (23), such that at low wind speed, when the wind rotor (2) rotates at a speed lower than a rated rotor speed of the generator (3) the brake is engaged and the flow of power is transmitted only between the wind rotor (2) and the electric machine (4); and wherein the low wind speed is below a start-up value but above a minimum operating speed, such that the wind rotor (2) rotates at a speed lower than a fated rotor speed of the main generator (3).

6. A method of controlling operation of a wind power turbine that comprises a wind rotor (2) that is operable at variable speeds, a main generator (3) that is operable at constant speed and an electric machine (4) that is operable at variable speeds, which are in driving connection with one another by way of a superimposition transmission (5) such that the electric machine (4), as a power control device for regulating the speed of the main generator (3), being operable both as an additional generator and as a motor and being connected to a power grid (14) via a frequency converter (15), the method comprising the steps of:

applying a controllable holding brake (23), at low wind speed, that is arranged between the superimposition transmission (5) and the main generator (3);

deactivating the main generator (3) and operating the electric machine (4) as the additional generator to produce electric current; and supplying the electric current to the power grid (14) via the frequency converter (15).

7. The method according to claim 6, further comprising the step of, at a wind speed which is lower than a start-up speed but above a minimum operating speed, accelerating the wind rotor (2) by operating the electric machine (4) as the motor at least until a minimum speed is reached and subsequently switching operation of the electric machine (4) into operation as the additional generator.

8. The method according to claim 6, further comprising the step of, before the holding brake is applied, synchronizing the holding brake (23) by operating the electric machine (4) as at least one of the additional generator and the motor.

9. The method according to claim 8, further comprising the step of synchronizing the holding brake (23), only when the wind rotor (2) is rotating, to avoid a tooth-on-tooth position of the holding brake (23) until a specified minimum speed difference is reached; and, when the wind rotor (2) is static, producing a minimum speed difference at the holding brake (23).

10. The method according to claim 6, further comprising the step of connecting the wind rotor (2) to a main transmission (9) which is connected to the superimposition transmission (5).

11. The method according to claim 6, further comprising the steps of forming the superimposition transmission (5) as a sun gear (17), a planetary carrier (19) and a ring gear (20), connecting the planetary carrier (19) to the main transmission (9), connecting the sun gear (17) to a rotor (12) of the electric machine (4) and connecting the ring gear (20), the brake (23) and a rotor (10) of the main generator (3).

12. The method according to claim 6, further comprising the step of the coupling the brake (23), the main generator (3) and the wind rotor (2) with a control unit (28) which engages the brake (23), when the wind rotor (2) rotates at a speed lower than a rated rotor speed of the main generator (3) such that the flow of power is transmitted only between the wind rotor (2) and the electric machine (4).

13. A wind power turbine comprising:
a wind rotor (2) that is operated over a range of wind speeds,
a main generator (3) having a hollow drive input shaft and being operated at constant speed, and
an electric machine (4) having a central drive shaft which is surrounded by the hollow drive input shaft and the electric machine (4) being operated at a range of speeds;
the wind rotor (2), the drive input shaft of the main generator (3) and the central drive shift of the electric machine (4) being coaxially aligned with one another along a rotational axis;
a superimposition transmission (5) being axially located in a flow of power between the wind rotor (2) and the main generator (3);
the wind rotor (2), the superimposition transmission (5), the main generator (3) and the electric machine (4) being interconnected to transmit the flow of power from the wind rotor (2) to at least one of the main generator (3) and the electric machine (4);
the electric machine (4) being operable as an additional generator and a motor to regulate the rotational speed of the main generator (3);
the main generator (3) being directly connected to a power grid (14) while the electric machine being connected to a power grid (14), via a frequency inverter (15);
a brake (23) being permanently connected to the drive input shaft of the main generator and being axially located, in the flow of power, between the superimposition transmission (5) and the main generator (3), and the brake being actuated, at low wind speed, by a control unit to directly couple the drive input shaft of the main generator to a housing for braking rotation and deactivating of the main generator (3) and prevent rotation of the generator (3) so that all electric current flowing to and from the power grid only flows through the frequency inverter (15) and the electric machine (4).

14. The wind power turbine according to claim 13, wherein the wind rotor (2) is continuously connected to an input shaft of a main transmission (9) which is connected to the superimposition transmission (5).

15. The wind power turbine according to claim 14, wherein the superimposition transmission (5) is a planetary gearset comprises a sun gear (17), a planetary carrier (19) and a ring gear (20), the planetary carrier (19) is continuously connected to an output shaft of the main transmission (9), the sun gear (17) is continuously to the central drive shaft of the electric machine which is continuously connected to a rotor (12) of the electric machine (4) and the ring gear (20) is continuously connected to each of the drive input shaft of the main generator, the brake (23) and a rotor (10) of the main generator (3).

16. The wind power turbine according to claim 13, wherein the brake (23), the main generator (3) and the wind rotor (2) each communicate with a control unit (28) which engages the brake (23), when the wind rotor (2) rotates at a speed lower than a rated rotor speed of the main generator (3) such that the flow of power is transmitted only between the wind rotor (2) and the electric machine (4).

17. The wind power turbine according to claim 15, wherein the brake is axially located between the planetary gearset and the main generator and the main generator is axially located between the brake and the electric machine.

* * * * *